(12) United States Patent
Thomas, III

(10) Patent No.: US 8,113,434 B2
(45) Date of Patent: Feb. 14, 2012

(54) PASSIVE ELECTRO-OPTICAL IDENTIFICATION TAGS

(75) Inventor: Fred Charles Thomas, III, Fort Collins, CO (US)

(73) Assignee: Britta Technologies, LLC, Las Vegas, NV (US)

( * ) Notice: Subject to any disclaimer, the term of this patent is extended or adjusted under 35 U.S.C. 154(b) by 1075 days.

(21) Appl. No.: 11/480,105

(22) Filed: Jun. 30, 2006

(65) Prior Publication Data
US 2008/0000976 A1 Jan. 3, 2008

(51) Int. Cl.
G06K 19/02 (2006.01)
G06K 7/10 (2006.01)
G06K 7/14 (2006.01)
G03H 1/00 (2006.01)
G02B 5/124 (2006.01)

(52) U.S. Cl. ............ 235/488; 235/454; 359/2; 359/350; 359/530; 250/271; 283/81; 283/91; 430/1

(58) Field of Classification Search .................... 283/86, 283/85, 91, 94, 81; 235/487, 488, 490–494; 359/1, 2, 15, 19, 20, 668, 671, 350, 529, 359/530, 533; 430/1, 2; 340/572.1; 428/40.1, 428/42.3; 250/231.13–231.18, 555, 556, 250/271; 356/71
See application file for complete search history.

(56) References Cited

U.S. PATENT DOCUMENTS

| | | | | |
|---|---|---|---|---|
| 3,743,820 A * | 7/1973 | Willits et al. | .................. | 235/437 |
| 4,222,662 A * | 9/1980 | Kruegle | ............................ | 355/40 |
| 4,368,979 A * | 1/1983 | Ruell | ............................... | 356/71 |
| 5,118,930 A * | 6/1992 | Takada | .......................... | 235/488 |
| 5,200,851 A * | 4/1993 | Coderre et al. | ............... | 359/351 |
| 5,237,164 A | 8/1993 | Takada | | |
| 5,344,808 A * | 9/1994 | Watanabe et al. | ............. | 503/227 |
| 5,477,219 A * | 12/1995 | Zarembo et al. | ........... | 340/572.3 |
| 5,656,360 A * | 8/1997 | Faykish et al. | ............. | 428/195.1 |
| 5,742,411 A * | 4/1998 | Walters | ............................. | 359/2 |
| 5,856,048 A * | 1/1999 | Tahara et al. | ..................... | 430/1 |
| 6,000,804 A * | 12/1999 | Kimura | ......................... | 359/536 |
| 6,019,287 A | 2/2000 | Mann | | |
| 6,024,455 A * | 2/2000 | O'Neill et al. | ................ | 359/530 |
| 6,269,169 B1 * | 7/2001 | Funk et al. | ..................... | 382/100 |
| 6,507,441 B1 | 1/2003 | Eisenberg et al. | | |
| 6,536,672 B1 * | 3/2003 | Outwater | ...................... | 235/491 |
| 6,542,083 B1 | 4/2003 | Richley et al. | | |
| 6,747,768 B1 * | 6/2004 | Knocke et al. | ..................... | 359/2 |
| 6,843,564 B2 | 1/2005 | Putilin et al. | | |
| 7,074,478 B2 * | 7/2006 | Abraham | ...................... | 428/209 |
| 7,190,907 B2 | 3/2007 | Cicchiello | | |
| 7,387,393 B2 * | 6/2008 | Reich et al. | .................... | 359/529 |

(Continued)

FOREIGN PATENT DOCUMENTS

EP 0 265 827 5/1988

(Continued)

OTHER PUBLICATIONS

International Search Report and Written Opinion from Co-Pending Application, PCT/US2007/071957, published as WO 08/005725.

(Continued)

*Primary Examiner* — Michael G Lee
*Assistant Examiner* — Suezu Ellis
(74) *Attorney, Agent, or Firm* — Knobbe Martens Olson & Bear, LLP

(57) ABSTRACT

Embodiments for electro-optical identification are disclosed.

28 Claims, 8 Drawing Sheets

U.S. PATENT DOCUMENTS

| | | | |
|---|---|---|---|
| 7,498,074 B2 * | 3/2009 | Ueda et al. | 428/131 |
| 2002/0142121 A1 * | 10/2002 | Hingsen-Gehrmann et al. | 428/40.1 |
| 2003/0174941 A1 | 9/2003 | Cizek | |
| 2006/0060651 A1 | 3/2006 | McIntyre et al. | |
| 2006/0151989 A1 * | 7/2006 | Muke et al. | 283/67 |
| 2008/0000990 A1 | 1/2008 | Thomas | |

FOREIGN PATENT DOCUMENTS

| | | |
|---|---|---|
| EP | 416742 A2 * | 3/1991 |
| EP | 0 660 292 | 6/1995 |
| EP | 1 455 205 | 9/2004 |
| WO | WO 99/36806 | 7/1999 |
| WO | WO 02/33477 | 4/2002 |
| WO | WO 2008/005724 | 1/2008 |
| WO | WO 2008/005725 | 1/2008 |

OTHER PUBLICATIONS

International Search Report and Written Opinion from Co-Pending Application, PCT/US2007/071955, published as WO 08/005724.

Non-Final Office Action dated Jul. 24, 2009 in U.S. Appl. No. 11/479,578.

Notice of Allowance dated Sep. 9, 2010 in U.S. Appl. No. 11/479,578.

* cited by examiner

310

PASSIVE ELECTRO-OPTICAL IDENTIFICATION TAGS

FIELD

The subject matter disclosed herein relates to electro-optical identification tags.

BACKGROUND

Automated identification of goods and other articles has become commonplace. Radio frequency identification (RFID) tags may be used to track the shipment and inventory of goods. In the coming years, RFID tags may be found on goods offered for sale at a large number of retailers. RFID tags may also be used in other applications, including electronic toll collection for vehicles.

Other techniques for automated identification of goods or other articles may utilize bar codes. However, RFID and bar code technologies may suffer from various shortcomings, including limited range and/or excess expense. For example, bar code scanning may function properly from a maximum distance of several feet, and typical bar code implementations may require that the bar code be scanned from a maximum distance of only several inches. Similarly, passive RFID implementations may have effective ranges of only a few feet. Active RFID technologies may provide increased range, but at a significant increase in cost due in part to the active circuitry of the RFID tag, including power supplies that may have limited life spans.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
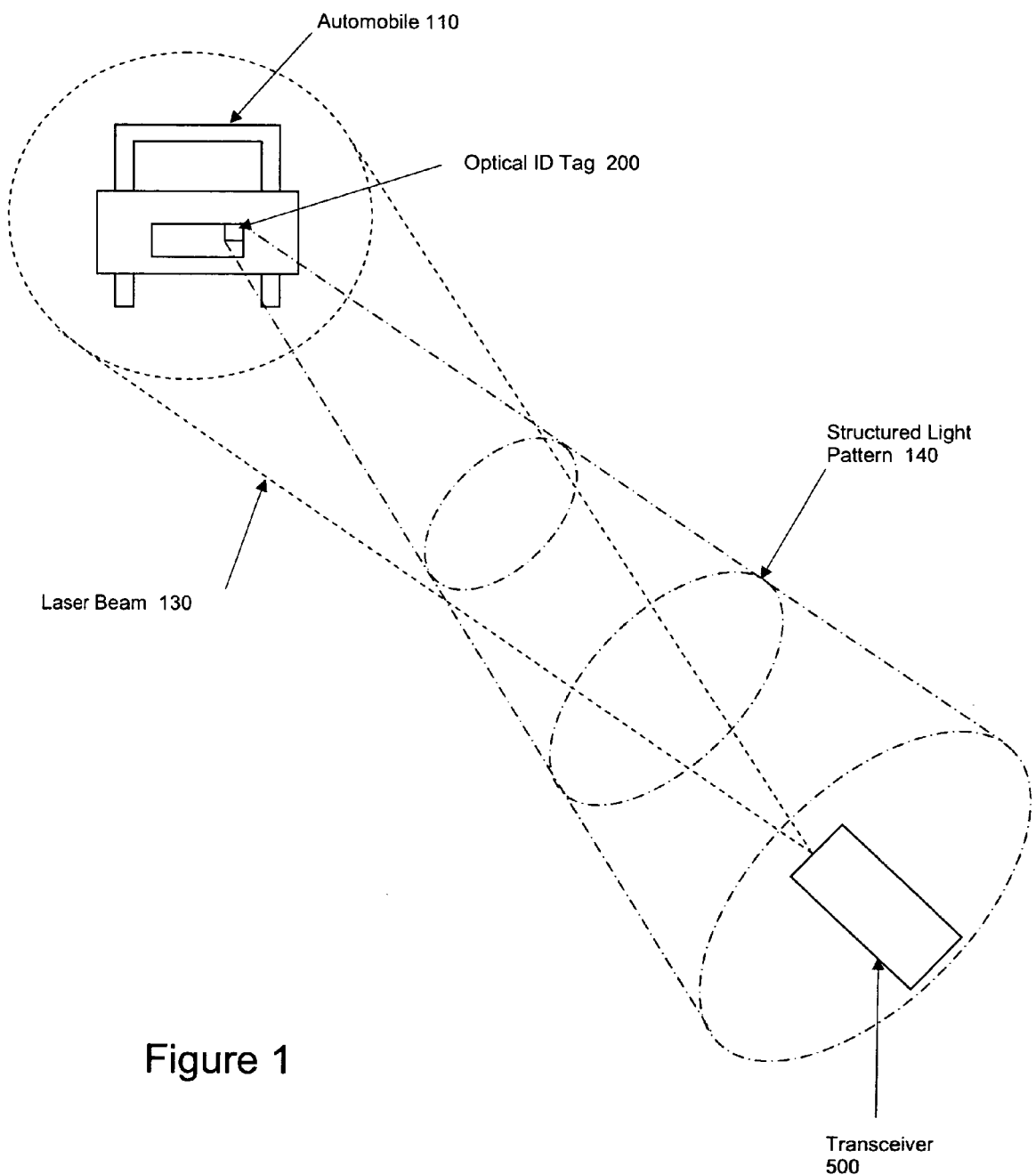
FIG. 1 is a diagram depicting an example embodiment of an optical identification tag located on an automobile and an example embodiment of an electro-optical transceiver.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As pointed out above, difficulties with state of the art technology, particularly in automated identification, for example, may include limited range and/or excessive cost. A need, therefore, exists for techniques and/or systems that may provide automated identification at greater ranges and at lower costs.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

As used herein, the term "retroreflective" is related to techniques and/or devices for reflecting light approximately back along a path to a light source.

As used herein, the term "retrodireactional" is related to techniques and/or devices for redirecting light approximately back along a path to a light source. Retrodireactional techniques and/or devices may comprise retroreflective techniques and/or devices, and may also comprise other techniques for redirecting light such as phase conjugation.

As used herein, the term "light encoding" is related to any techniques and/or devices for encoding information by altering any characteristics of retroreflected light. Devices capable of altering characteristics of and/or spatial distribution of light may be referred to as "light modification elements." These techniques and/or devices may include, but are not limited to, refractive holograms, diffractive holograms, nanograting optical phase retarders, and/or nanograting polarizers. Again, these are merely examples of techniques and/or devices for "light encoding", and the scope of the claimed subject matter is not limited in these respects.

As used herein, the term "layer" as it relates to optical identification tags is meant to include any sub-portion of an optical identification tag. For an embodiment, a layer may comprise a sheet of relatively thin material that may or may not comprise retroreflective and/or light encoding structures. For an embodiment, two or more layers may be placed and/or formed one on top of the other to form an optical identification tag. For some embodiments, multiple layers may be formed on a single sheet of plastic. However, these are merely examples of layers as related to optical identification tags, and the scope of the claimed subject matter is not limited is these respects.

In general, one or more embodiments for electro-optical identification may provide identification capabilities that work at long distances (possibly up to a mile or more) with appropriate line-of-sight and visibility. An embodiment may comprise a passive thin embossed plastic optical identification tag which may be adhesively attached to an item for identification. An optical identification tag implemented in accordance with one or more embodiments described herein may have a sub $0.05 cost in mass production. An optical identification tag implemented in accordance with one or more embodiments described herein may be read with a solid state laser-based transceiver unit.

The various possible optical identification tag embodiments described herein may be utilized in any of a wide range of applications. For example, one application of the embodiments described herein may include placement of optical identification tags on automotive vehicle license plates for police identification at a distance. Other possible applications may include toll-road fee collection and low-cost homeland security traffic route observation. Rail train car automated identification and inventory while passing into train yards may be another application. The tracking of shipping containers may be yet another possible application. Further, the embodiments described herein may provide for similar functionality as other passive "automated identification and data capture" (AIDC) techniques such as 2-D or 3-D bar code and passive RFID tags. However, the electro-optical identification embodiments described herein may provide these functionalities over distances much greater than the few inches to feet at which the prior technologies are effective. Also, the optical identification tags described herein may maintain the same lost-cost ID tag advantage of the prior passive AIDC technologies.

One or more optical identification tag embodiments described herein may comprise a combinational use of micro retroreflective arrays, refractive and/or diffractive holographic light modification elements, nano-replicated light polarization and/or phase retardation altering nano-grating structures, and/or other nano-structural array based light property altering mechanisms. A micro retroreflective array may comprise a number of corner cube retroreflectors that may comprise very small, efficient prism reflectors that return light rays approximately toward their source.

One embodiment of an optical identification tag may comprise a small checkerboard pattern where one or more elements of the pattern retroreflects light in a unique structural pattern. Each element of the checkerboard pattern may be encoded to a different state, although in some embodiments states may be replicated to enhance reliability. Elements of the checkerboard pattern may be encoded to different states by varying phase and polarization states among the elements via the use of mass replicated nano-grating elements. The nano-grating elements may be positioned and/or formed on top of refractive and/or diffractive holographic elements. Encoding each optical identification tag with a unique identification number may be performed in the field with the use of a laser printer and appropriate software to blacken out selected elements for a non-reflective state. Error code correction may also be incorporated into the pattern for some embodiments. Various example embodiments of optical identification tags are discussed in more detail below.

FIG. 1 illustrates an embodiment of an optical identification tag 200 affixed to a license plate of an automobile 110. A transceiver 500 is depicted illuminating the automobile 110 with a laser beam 130. A structured light pattern 140 is returned from optical identification tag 200 back to transceiver 500. Transceiver 500 may decode information encoded in the structured light pattern returned from tag 200. For one embodiment, laser beam 130 may emerge from transceiver 500 with a bivariant Gaussian power distribution, or 3-D bell-shaped profile. The divergence of laser beam 130 may be adjusted via optical components in transceiver 500 such that the optical identification tag illuminating energy profile is optimized for the distance between the tag and the transceiver. This optimization may comprise a trade off between having the highest level of laser energy flux on illuminating tag 200 while at the same time making the illumination spot big enough such that vibration and jitter of a handheld transceiver for one embodiment does not result in the laser beam falling off of tag 200. Closed loop optimization of the beam divergence, as well as optimal directional pointing, may be included in some embodiments. Also for some embodiments, the laser beam's optical properties relative to polarization state, coherence and/or wavelength are properties that may be set and/or adjusted dynamically by electro-optical components within transceiver 500.

Optical ID tag 200 may retroreflect light from multiple discrete areas on the tag. Each area, along with a micro-retroreflective backplane, may have light modification physical optical elements in front of the retroreflective backplane. These light modification elements may take the form of diffractive holograms, refractive holograms, and/or micro- to nano-scale arrayed or geometrical optical elements such as gratings, lenses, and/or blazed gratings. These structures in aggregate may comprise an apparatus for producing a particular localized light property change for that discrete reflecting area which for some embodiments may be different from the other discrete reflecting areas within the array of discrete elements comprising Optical ID tag 200.

For some embodiments, redundancy of discrete structured pattern reflection areas may be incorporated into the tag. Redundancy of discrete areas or elements may for some embodiments be used to provide multiple equivalent data states to enhance the optical path reliability of tag 200. For example, if one element becomes obstructed from view accidentally via contamination (mud, dirt, physical damage, etc.), the code is not corrupted. Similarly, for some embodiments error correction encoding (ECC) may be incorporated to further increase reliability.

Figure 2A:
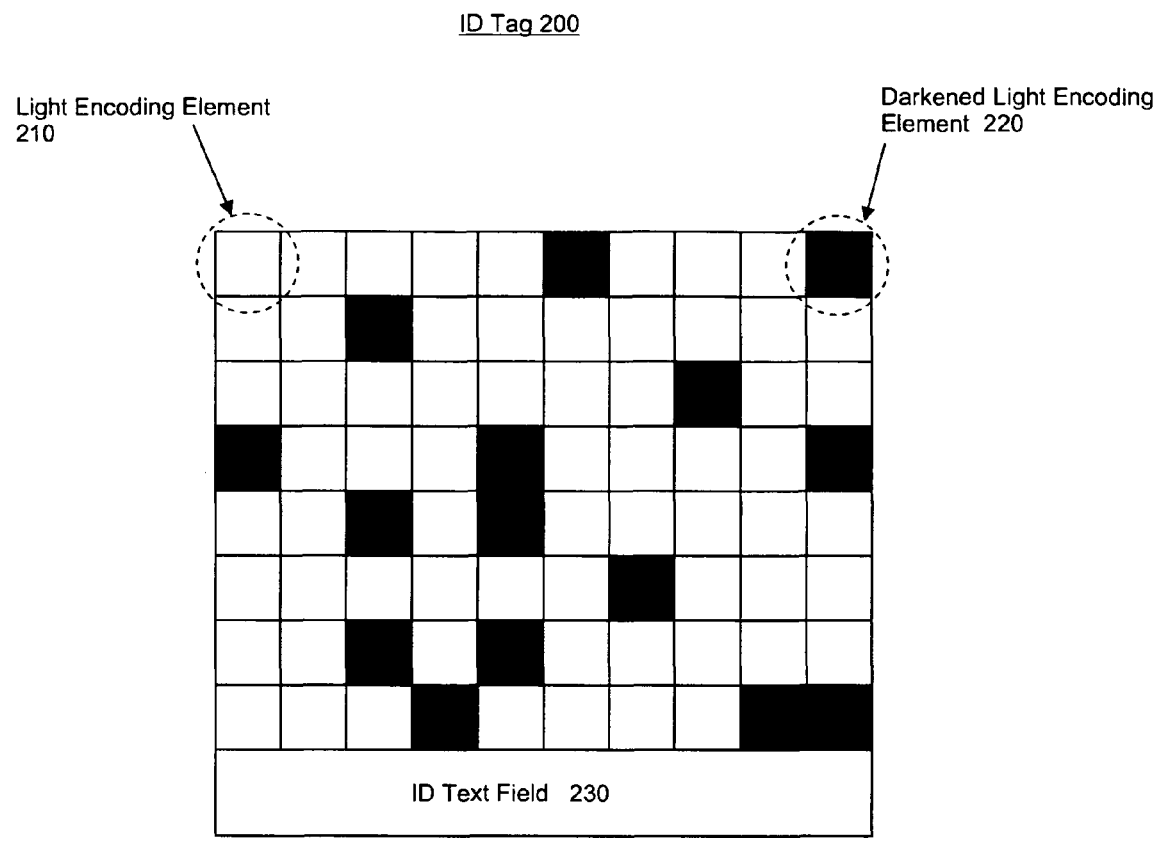
FIG. 2a is a diagram depicting a top view of an example embodiment of an optical identification tag.

FIG. 2a depicts an example embodiment of optical identification tag 200. For this example the checker board pattern depicted in FIG. 2a represents optical ID tag 200. An ID tag may be capable of being adhesively applied to an object such a automobile license plate as shown in FIG. 1. Tag 200 may comprise an aggregation of numerous separate retroreflective elements arranged in an array. Two such elements are labeled 210 and 220. The separate elements may impart some spatial and/or polarization and/or phase and/or amplitude profile and/or wavelength shifting properties to a light wave transversing the elements. The modified light wave may be retroreflected back toward a light source such as transceiver 500 of FIG. 1.

For the example embodiment depicted in FIG. 2a, the various separate elements may be arranged in an array of small squares. Embodiments are possible where the elements may be geometrically shaped in any form and arrayed into any overall tag shape. For example, although tag 200 is depicted as having a rectangular shape, other embodiments are possible where the tag may be circular in shape with wedge or pie shaped encoding elements. However, these are merely examples of how an optical identification tag may be shaped, and the scope of the claimed subject matter is not limited in this respect.

As depicted in FIG. 2a, some of the light encoding elements (such as element 210) are clear (shown as white) and some are darkened (such as element 220). For some embodiments, the darkening of prefabricated elements is how the tag may be encoded with information prior to use. For example, a manufactured sheet comprising one or more optical identification tags may be place into a laser printer and the ID numbers for a single tag or a series of tags are determined by a user or some automated computer-based logistical program. Identification numbers may be imparted to the tag via darkening some of the array of light encoding elements. The darkening of selected elements precludes those elements from reflecting light when the tag is interrogated or polled by a transceiver's laser or other light source. The absence of a particular state spatially and/or optically (polarization/phase/amplitude, etc.) in the reflected light pattern may comprise at least part of the reflected encoded signal from the tag. As discussed above, elements in the array may be redundant and therefore multiple elements may need to be darkened to remove a particular discrete state from the reflected encoded signal.

For one embodiment, tag 200 may also comprise an ID text field 230 where the identification number associated with the tag may be printed in alphanumeric characters. The ID text may be printed on the tag concurrently with the darkening of elements via a printer.

Figure 2B:
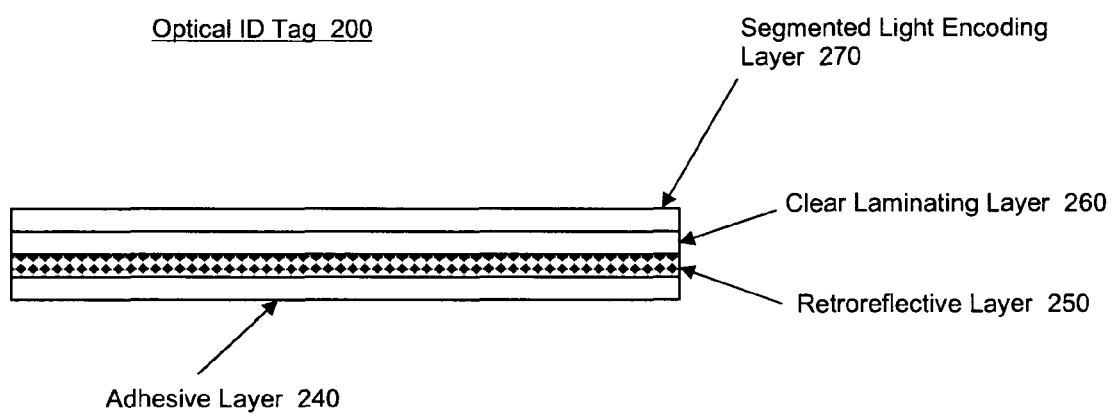
FIG. 2b is a diagram depicting a cross-sectional view of an example embodiment of an optical identification tag.

FIG. 2b depicts a cross-sectional view of optical ID tag 200. For this embodiment, an adhesive layer may be positioned beneath a retroreflective layer 250. Adhesive layer 240 may provide a benefit of allowing the tag to be easily attached to an object. Retroreflective layer 250 may comprise a layer of retroreflective material such as small cat's eyes or corner cubes replicated into a plastic sheet. These retro-reflective micro structures that comprise retroreflective layer 250 may be aluminized or coated with some other highly light reflective metal or other film. Alternatively, retroreflective materials coated with small glass beads may be used for some embodiments.

For an embodiment, a clear laminating layer 260 may be positioned over retroreflective layer 250. Clear laminating layer 260 may comprise a clear thin sheet of plastic or other transparent material, and may be used for any of a wide range of purposes. Clear laminating layer 260 may comprise an approximately 0.002" thick optically clear adhesive layer to hold the various elements together as a single tag. Retroreflective layer 250 may be embossed or otherwise applied to clear laminating layer 260. Other embodiments may not include layer 260. For example, in one or more embodiments retroreflective elements may be formed on one side of a single sheet of plastic and various light modification elements may be formed on another side of the sheet of plastic, and no laminating layer is used.

For an embodiment, a segmented light encoding layer 270 may be positioned over clear laminating layer 260 and/or retroreflective layer 250. For one embodiment, retroreflective layer 250 may be embossed or otherwise applied to segmented light encoding layer 270. For an embodiment, a front side of layer 270 may be embossed or otherwise comprise a replicated pattern (perhaps a checker board in one example) of light encoding elements such as elements 210 and 220 depicted in FIG. 2a. Other replication techniques may include nano-replication methods such as embossing a gray-scale exposure sensitive photoresist on a thin plastic substrate with the light encoding element structure and then reactive ion milling the embossed substrate for production of the nano-structurally encoded light modification elements. Segmented light encoding layer 270 may comprise a plastic sheet for one or more embodiments. For an embodiment, light encoding elements formed in layer 270 may comprise refractive holograms embossed in the surface of the plastic sheet. For some embodiments, segmented light encoding layer 270 may comprise diffractive holograms. For some embodiments, segmented light encoding layer 270 may comprise nano-grating structures or other arrayed and deterministic transmissive or reflective light modification structures. Some embodiments may comprise both refractive and diffractive holograms, although the scope of the claimed subject matter is not limited in this respect.

For some embodiments, another layer may be coated over or otherwise applied to the hologram layer. This additional layer may comprise a nano-replicated array of nano-grating based polarizers or nano-grating based phase retarders. For one embodiment, the nano-grating based polarizers may comprise a grid of perforated silicon that may be capable of slowing the speed of light moving through the grid. These type of structures may be nano-replicated and used to fully retard in time portions of a light pulse reflected from individual light encoding elements on the passive optical ID tag 200. This type of encoding of light may be referred to as pulse-delay-stream encoding of light. For an embodiment, a uniform pulse of light (perhaps with a Gaussian profile in the time domain) may be sent out to interrogate the tag and with pulse-delay-stream encoding the retroreflected pulse may comprise information bearing structure or encoding in the time domain.

A combination of two or more of the aforementioned light altering structures in the transmission path of a light encoding element 210 may impart unique spatial and/or light state properties to light reflected from that element that may constitute a unique encoded data state. Such data states may be binary or they may be multi-level and hence may provide for numerous possible state levels within the same reflected spatial area of the encoded signal segment.

Although optical identification tag 200 has been discussed with particular arrangements of layers and/or elements, any of a wide range of embodiments are possible. Possible embodiments may comprise a wide range of varying combinations of materials and/or elements, including but not limited to combinations comprising any or all of the aforementioned light spatial altering structures and materials as well as any or all of the aforementioned light property altering structures and materials. Embodiments may comprise the use of elements such as diffractive holograms, wavelength filtering materials and films, and/or other elements or materials arrayed in patterns to encode information in light reflected back upon an interrogating and irradiating source. For some embodiments, the wavelength of the irradiating source may range from the near ultra-violet to the far infrared, although the scope of the claimed subject matter is not limited in this respect.

Figure 3A:
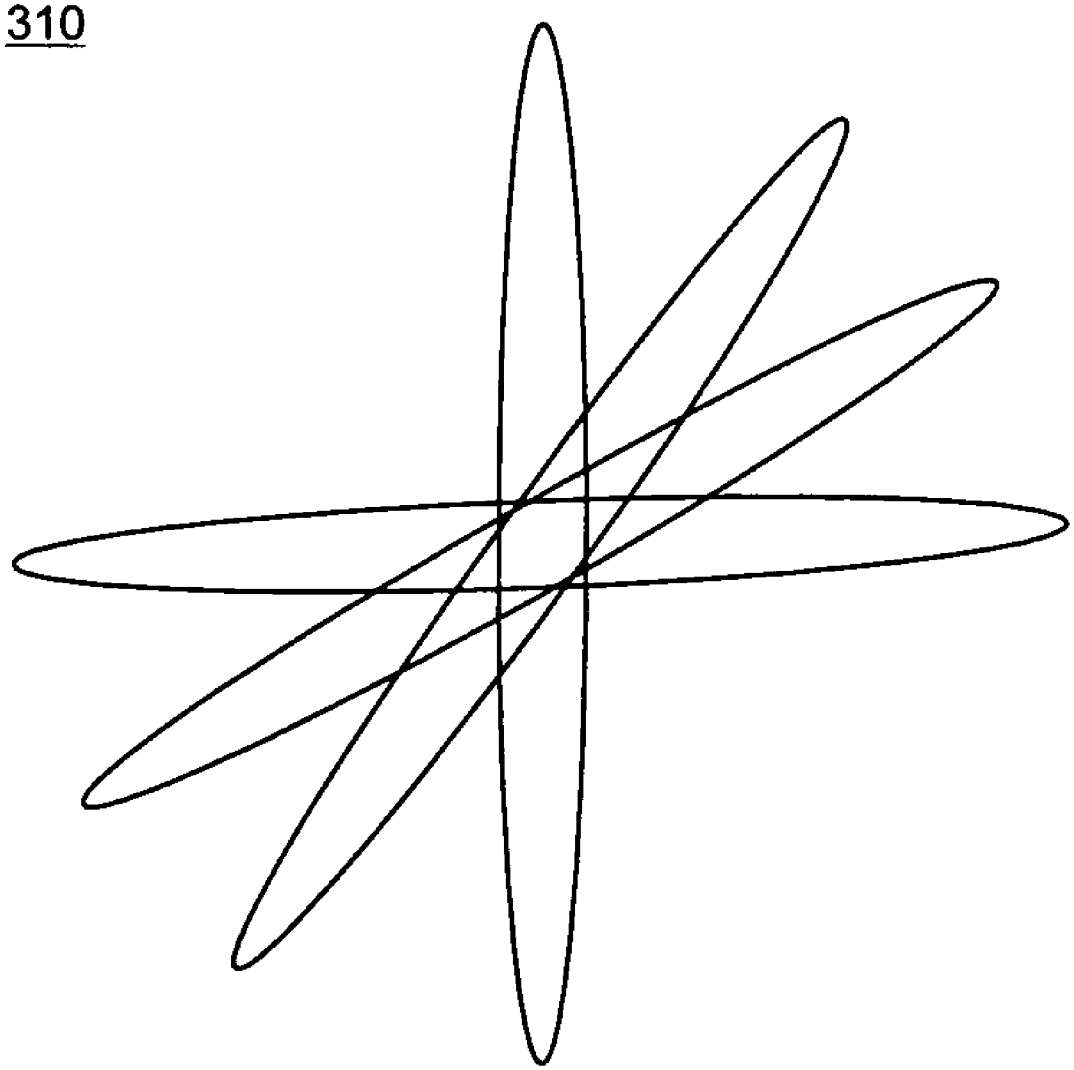
FIG. 3a is a diagram depicting an example light spoke structured light pattern.

FIG. 3a depicts one possible structured light pattern embodiment. Such a structured light pattern may be reflected from an optical identification tag implemented in accordance with one or more embodiments described herein. The possible structured light pattern depicted in FIG. 3a (labeled 310), may be referred to as a "spoke pattern." Spoke pattern 310 is depicted as having four axes. However, this is merely an example pattern and the scope of the claimed subject matter is not limited in this respect. Some embodiments may provide for larger numbers of axes. The four axes shown for this example may be produced using four light encoding elements comprised of a retroreflective backplane and astigmatic light modification transmissive refractive holograms such as those discussed above. With holographic elements, one may select the divergence one would like to impart on a beam of light passing through it. For example, a divergence of 0.1 degrees in the minor axis and 2.0 degrees in the major axis may produce elliptical lines such as those shown in pattern 310. Because a beam of light may pass through the light modification elements of an optical identification tag twice during its round trip return to a transceiver, the full divergence imparted by each encoding element is a RMS (root-mean-square) of the single path divergence. The angular orientation of the spokes of pattern 310 relative to each other may be a product of the holograms in each physical element of an ID tag being rotated physically relative to each other. For this example, there is no encoding of information via optical state (e.g. polarization, amplitude profiling, wavelength shifting or phase retardation). Information for this embodiment may be decoded from spoke pattern 310 via the spokes which are known to be in fix physical location being present or not and also via the distance between adjacent spokes. However, this is merely one example of a spoke pattern, and the scope of the claimed subject matter is not limited in this regard.

Figure 3B:
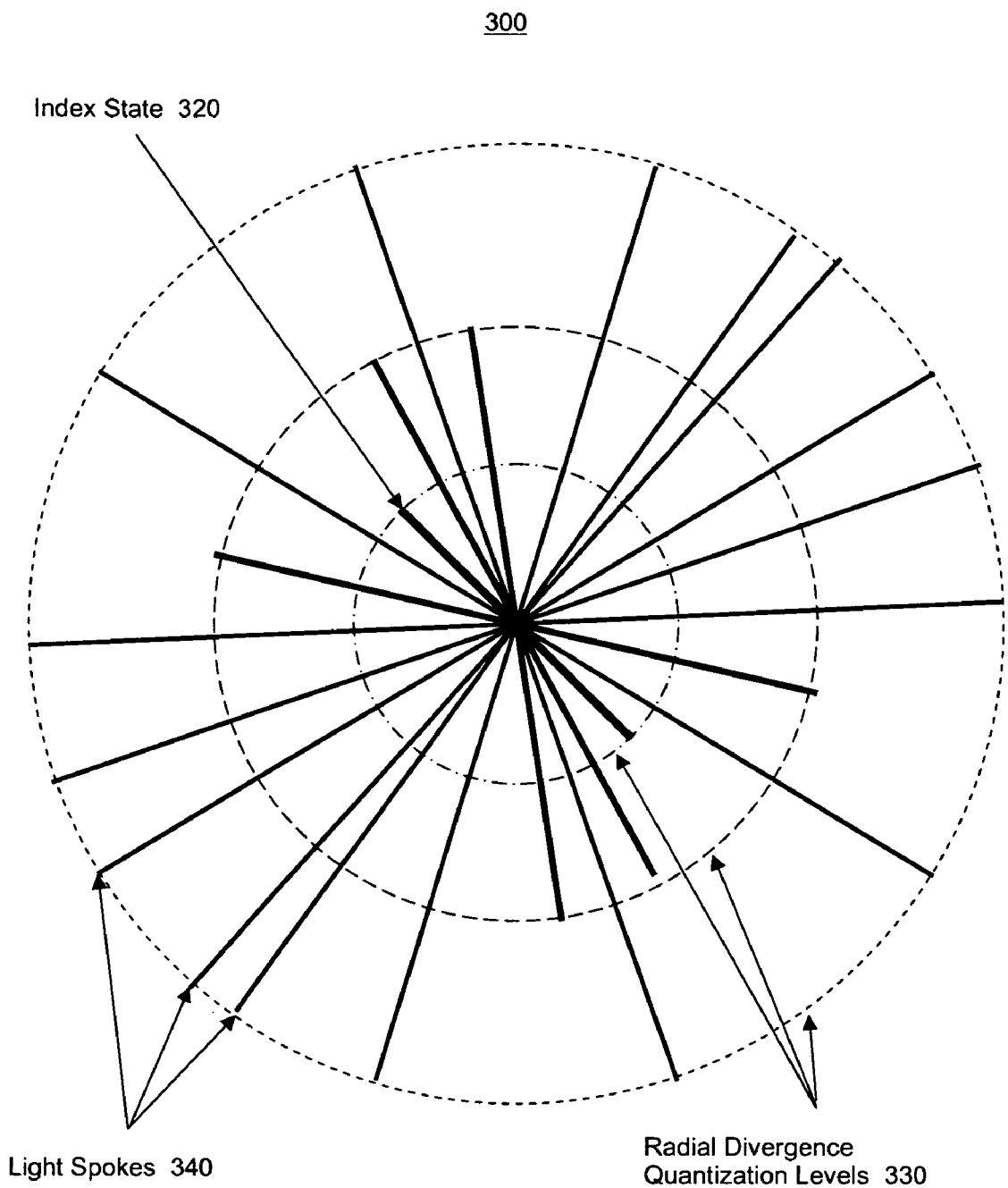
FIG. 3b is a diagram depicting an example light spoke structured light pattern.

FIG. 3b illustrates in more detail an example "spoke pattern" structured light pattern embodiment (labeled pattern 300). For this example embodiment, structural light spokes 340 may be presented every 5 degrees of rotation. Therefore, for this example, the pattern may comprise as many as thirty-six spokes 340. The length or divergences of the spokes for this example may have any one of three lengths, or one or more spokes may not be present at all. The lengths or divergences of spokes 340 may be represented by radial divergence quantization levels 330 as depicted in FIG. 3b. Although for this example embodiment three quantization levels are described for non-absent spokes, other embodiments are possible using any of a wide range of quantization levels.

For this example embodiment, the shortest length and hence brightest spoke (assuming same number of equal sized light encoding elements 210 are used to create each spoke) of pattern 300 comprises an index or reference state 320 for the pattern. An electro-optical transceiver, perhaps such as described below in connection with FIG. 5, may detect and locate index spoke 320 first and then may read the remainder of the data encoded in the spokes either clockwise or counter-clockwise from the index spoke.

As previously mentioned, for this example embodiment each spoke 340 of pattern 300 may have two other information encoding states incorporated into the divergence or length of each of spoke 340. Therefore, for this example, the number of possible states in the pattern may number seventy-two (two states for each of the thirty six spokes). However, for some embodiments, each of the spokes may also have associated with it phase retardation and/or polarization and/or amplitude profile modified and/or wavelength shifted states. If for one embodiment phase retardation of the light relative to index state 320 is used as a next hierarchical encoding mechanism and assuming for this embodiment that a five degree change in phase is detectable, then another seventy-two states may be detectable for this pattern. The total number of states then possible for this example pattern with these example boundary conditions is 5184 (72×72). Because the logarithm in base 2 of 5184~12.34, for this example embodiment using the conventions described, over 12 bits of data may be encoded. Other additional encoding techniques may be implemented such as using the distance between spokes to encode information and/or using polarization states which are fixed and/or rotated linear polarization states with no retardance and/or using energy distribution or signatures. For embodiments using any of various combinations of the above-mentioned encoding techniques, very large numbers of bits of information may be encoded in optical identification tags. For some embodiments, 128 bits or more may be encoded in each tag.

Figure 4:
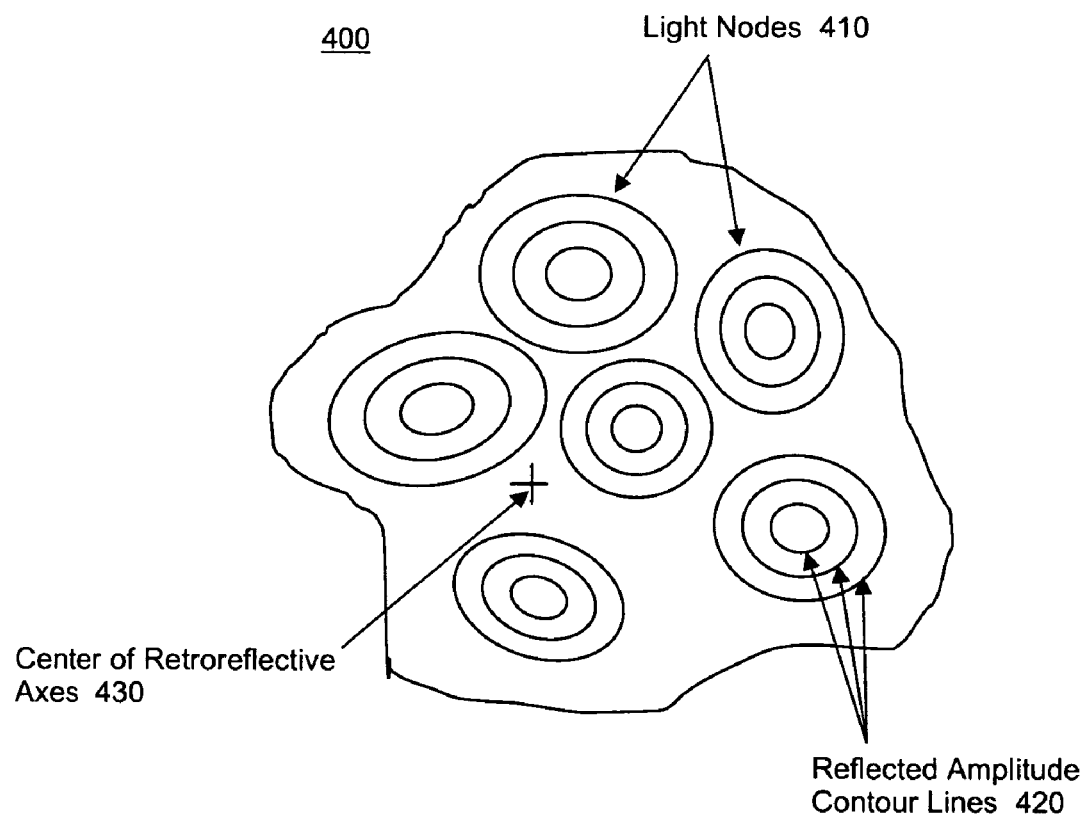
FIG. 4 is a diagram depicting an example light node structured light pattern.

FIG. 4 illustrates a second possible embodiment of a structural or spatial encoding pattern for retroreflections from a passive optical ID tag such as tag 200. The pattern 400 depicted in FIG. 4 may be referred to as a "distributed light node" pattern. An embodiment of a distributed light node pattern such as pattern 400 may be produced by having the elements of a tag such as tag 200 retroreflect and then slightly diffract directionally the various divergent nodes of light. The nodes 410 may be symmetric or astigmatic in any direction. The directionality of ellipticity relative to other nodes may be a form of data encoding for this embodiment. The relative position of nodes 410 relative to each other in the pattern may also be used to encode information. To further encode information, each of light nodes 410 may either be present or not and/or may have a large spectrum of different states of phase and/or polarization and/or may have different relative distances or positions from the center of the optical axes 430 of a transceiver's interrogating light source beam. Alternatively, a relative position from an index node may be used. Node amplitude and/or amplitude profiling may also be used to encode information. Any of a wide range of light modification techniques and/or elements, perhaps such as those described herein, may be implemented in a tag to produce distributed light node patterns in accordance with possible embodiments.

It is to be noted that for the example embodiments described herein, structured light patterns reflected from an optical ID tag such as tag 200 may travel through the atmosphere back at a transceiver (perhaps such as transceiver 500 described below) in a divergent manner. The transceiver may detect the diverging pattern. This may be accomplished for some embodiments by imaging the scattered light of the pattern from the atmosphere at one of many intermittent planes (see structured light pattern 140 of FIG. 1) that the structured light pattern transverses on its path back to the transceiver. Any of a range of techniques may be used in various possible embodiment of a transceiver to enhance detection of scattered structural patterns. The range of possible techniques may include modulating the laser at rates higher than atmospheric scintillation (1K to megahertz range) while simultaneously gating the detection array for the synchronous laser pulse duration, using a wavelength band pass filter such as a dichroic thin film filter to isolate the monochromatic reflected signal from ambient light, preclusion of optical entry rays with an angle of normalcy relative to the transceiver of less than some limiting angle, and/or observing multiple atmospheric object planes between the passive optical ID tag and the transceiver and electronically correlating the signal patterns in the images. These are merely examples of techniques for enhancing structured light pattern recognition, and the scope of the claimed subject matter is not limited in these respects.

Figure 5:
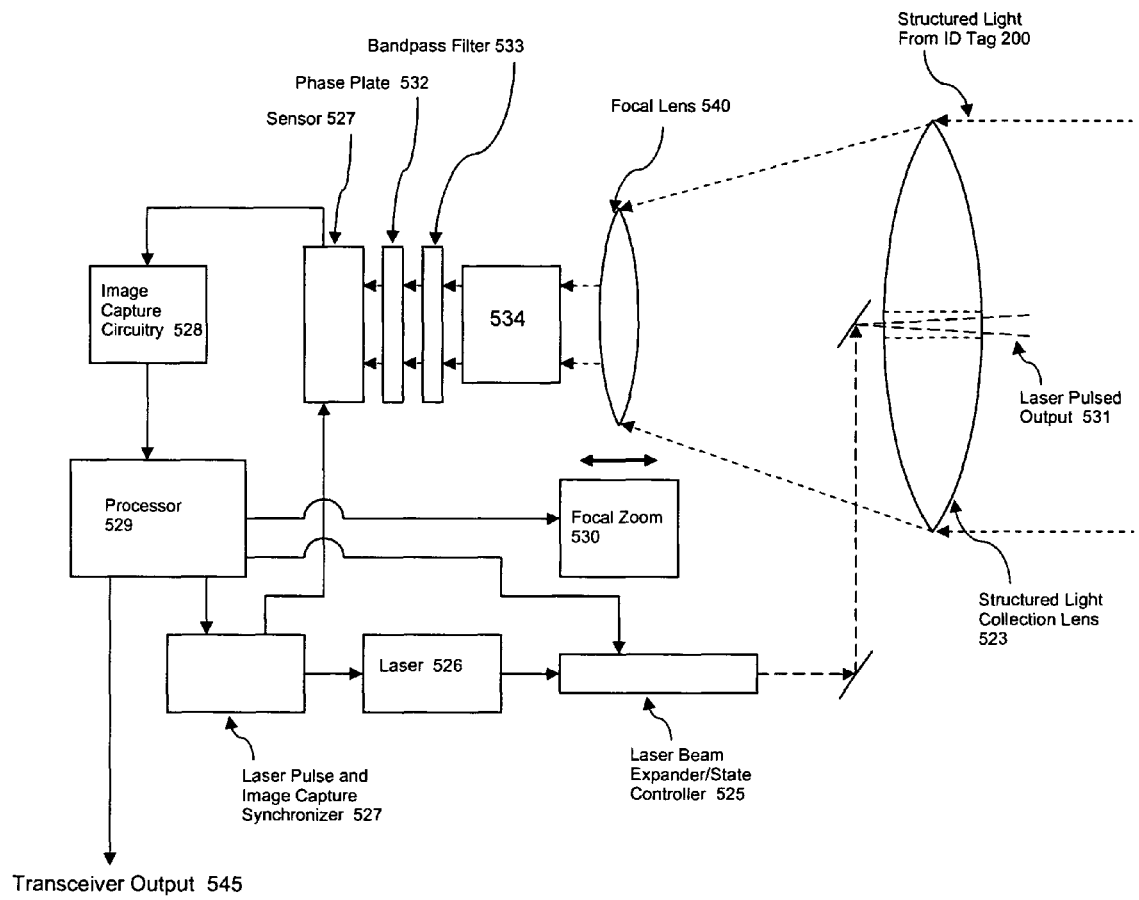
FIG. 5 is a block diagram of an example embodiment of an electro-optical transceiver.

FIG. 5 is a block diagram of an example embodiment of an electro-optical transceiver 500. A laser beam 531 produced by laser 526 may be directed out of the transceiver 500. A laser beam expander/state controller 525 may be placed in front of the laser 526. For an embodiment, expander/state controller 525 may expand the laser beam automatically to optimize the laser beam divergence for optimal spot size placement on the optical ID tag 200. For another embodiment, expander/state controller 525 may also comprise an electro-optical element such as a ferroelectric liquid crystal polarization rotator. By being able to change the interrogating polarization of laser beam 531, a rapid determination may be made of the optical properties of the light encoding elements 210 of tag 200 by rotating through all four stokes vector states with the beam 531 and comparing the amplitude of these states.

Interrogating laser beam 531 may emerge from transceiver 500 in a pulsed manner. The pulsed beam 531 may be synchronized with a laser pulse and image capture synchronizer unit 527 in order to reduce collection of background noise at a sensor 527. The pulsed beam 531 may be directed at the optical ID tag 200 via line-of-sight manual pointing or with assistance from a closed loop beam pointing optimization method such as a galvanometer control mirror system. Such a closed loop pointing system may maximize the amplitude of the optical ID tag return by aligning the central and brightest portion of the interrogating beam 531 with the optical passive ID tag 200.

As discussed previously, as the beam strikes tag 200, various light encoding elements 210 on the tag which are exposed (not darkened) may alter the various properties of light as discussed earlier. The resulting structured light pattern travels back toward the transceiver 500. The spatial pattern of the structured light pattern may be scattered by atmospheric gases and suspended particles (dust) in the atmosphere. The structured light pattern may be gathered by a fairly high numerical aperture collection lens 523. The field of view (FOV) of the image presented to sensor 527 may be adjusted by a secondary optic component/system comprising focal lens 540 and focal zoom component 530. The FOV may be automatically adjusted for optimal detection of the encoded structural light pattern based at least in part on the distance between the transceiver 500 and the optical ID tag 200. A bandpass optical filter 533 which may comprise a dichroic filter may be placed in the return optical path to filter out wavelengths of light not contributing to the optical ID signal. Significant increase in signal-to-noise ratio of the encoded optical signal may be obtained in this manner.

One embodiment may comprise an optical transfer and holographic quad image divider 534. Element 534 may be used to determine phase and polarization information by splitting the image of the structured light pattern signal into four images and looking at each image with each image being filtered with a different but orthogonally rotated polarizer such as a nano-grating polarizer. Each image path of the four images may be passed through a phase plate 532 to allow for stokes vector analysis and polarization and phase state determination of the various optical ID tag light encoding elements.

Sensor 527 may comprise a standard charge coupled device (CCD) or complementary metal oxide semiconductor (CMOS) imaging sensor. Another embodiment may scan the image at high speed onto a single or several high speed photodiodes. The captured image or images may be processed by an image capture circuit 528. The rendered images may be delivered to processor 529 where multi-level state analysis for each light encoded element 210 may be performed. For an embodiment, based at least on part on operations performed by processor 529, closed loop adjustments of laser beam parameters and image collection parameters may be made and further samples of the signal may be taken to ascertain with high confidence the encoded information in the optical ID signal.

Figure 6:
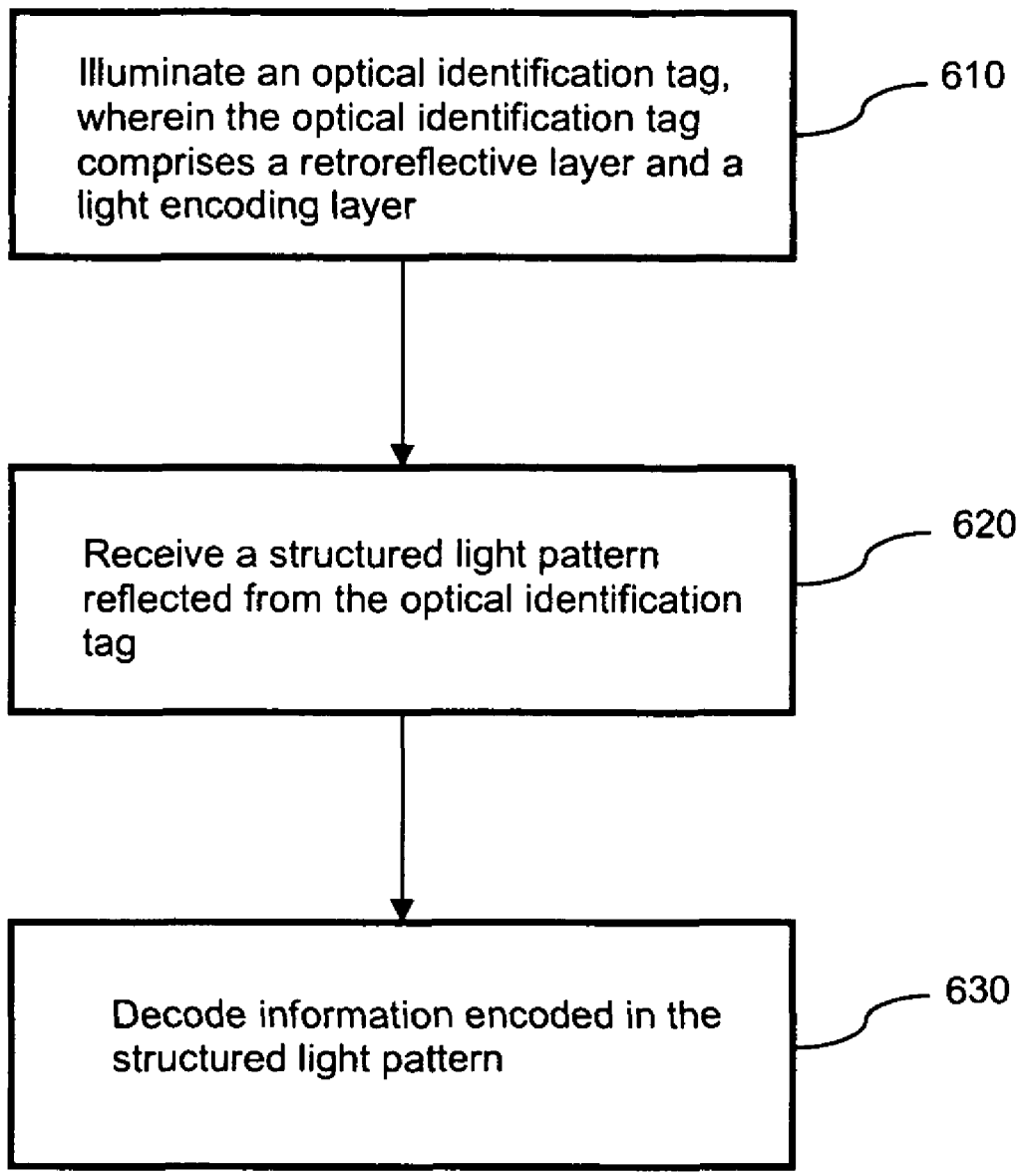
FIG. 6 is a flow diagram of an example embodiment of a method for electro-optical identification.

FIG. 6 is a flow diagram of an example embodiment of a method for electro-optical identification. At block 610, an optical identification tag may be illuminated. The optical identification tag may comprise a retroreflective layer and a light encoding layer. At block 620, a structured light pattern reflected from the optical identification tag may be received. For an embodiment, the structured light pattern may be received at a transceiver. At block 630, information encoded in the structured light pattern may be decoded. The decoding operations may be performed by a transceiver or some other computing platform. An embodiment in accordance with claimed subject matter may include all, more than all or less than all of blocks 610-630. Furthermore, the order of blocks 610-630 is merely one example order, and scope of the claimed subject matter is not limited in this respect.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. An optical identification tag comprising:
a substrate comprising light encoding elements and retroreflective elements, the light encoding elements and the retroreflective elements formed from a same material, wherein the retroreflective elements are formed from one side of the material and the light encoding elements are formed from another side of the material;
wherein the light encoding elements are configured to encode information in light received from a light source comprising non-visible wavelengths and wherein the light encoded with the information is retroreflected from the retroreflective elements without encoding further information in the received light;
wherein the light encoded with the information comprises wavelengths imperceptible to human eyes.

2. The optical identification tag of claim 1, wherein at least one of the light encoding elements and at least one of the retroreflective elements are embossed within the substrate.

3. The optical identification tag of claim 1, wherein the retroreflective elements comprise micro-retroreflectors.

4. The optical identification tag of claim 1, wherein the light encoding elements comprise light modification elements.

5. The optical identification tag of claim 4, wherein one or more of the light encoding elements comprise a refractive holographic light modification element.

6. The optical identification tag of claim 4, wherein one or more of the light encoding elements comprise a diffractive holographic light modification element.

7. The optical identification tag of claim 4, wherein one or more of the light encoding elements comprise a phase retardation structure.

8. The optical identification tag of claim 4, wherein one or more of the light encoding elements comprise a light polarization structure.

9. The optical identification tag of claim 4, wherein one or more of the light encoding elements are darkened to encode information.

10. The optical identification tag of claim 4, wherein the light encoding elements are capable of producing a distributed light node pattern.

11. The optical identification tag of claim 1, wherein the light encoding elements comprise light modification elements capable of producing a spoke pattern light structure.

12. The optical identification tag of claim 1, wherein at least one of the light encoding elements or the retroreflective elements are embossed on the material.

13. A method comprising:
receiving illumination at an optical identification tag, wherein the optical identification tag comprises a retroreflective layer and a light encoding layer configured to encode information in a structured light pattern retroreflected from the retroreflective layer; and
reflecting the structured light pattern comprising a spoke pattern of light including an index spoke;
wherein a location of one or more light spokes of the spoke pattern relative to the index spoke is usable in decoding the encoded information.

14. The method of claim 13, wherein receiving illumination at the optical identification tag comprises receiving illumination from a laser.

15. A method comprising:
illuminating an optical identification tag, wherein the optical identification tag comprises a retroreflective layer and a light encoding layer;
receiving a structured light pattern comprising a spoke pattern reflected from the optical identification tag; and
decoding information encoded in the structured light pattern according to at least a location of one or more light spokes of the spoke pattern relative to an index spoke of the spoke pattern.

16. A system comprising:
an optical identification tag comprising a retroreflective layer and a light encoding layer positioned over the retroreflective layer, wherein the light encoding layer is configured to encode information within a spoke pattern of light reflected by the retroreflective layer, wherein a location of one or more light spokes of the spoke pattern of light relative to an index spoke of the spoke pattern of light is usable in decoding the encoded information; and
an electro-optical transceiver comprising a light source capable of illuminating the optical identification tag and further comprising an optical sensor capable of receiving the spoke pattern of light reflected from the optical identification tag.

17. The system of claim 16, wherein the electro-optical transceiver further comprises an image processing unit capable of decoding information encoded in the spoke pattern of light reflected from the optical identification tag.

18. The system of claim 16, wherein the retroreflective layer comprises micro-retroreflectors.

19. The system of claim 16, wherein the retroreflective layer comprises a plurality of glass beads.

20. The system of claim 16, wherein the light encoding layer comprises light modification elements.

21. The system of claim 20, wherein one or more of the light modification elements comprise a refractive holographic light modification element.

22. The system of claim 20, wherein one or more of the light modification elements comprise a diffractive holographic light modification element.

23. The system of claim 20, wherein one or more of the light modification elements comprise a phase retardation structure.

24. The system of claim 20, wherein one or more of the light modification elements comprise a light polarization structure.

25. The system of claim 20, wherein one or more of the light modification elements are darkened to encode information.

26. An optical identification tag comprising:
- a retroreflective layer configured to retroreflect incident light; and
- a light encoding layer configured to encode information within a spoke pattern of light reflected by the retroreflective layer, wherein a location of one or more light spokes of the spoke pattern of light relative to an index spoke of the spoke pattern of light is usable in decoding the encoded information.

27. The optical identification tag of claim 26, wherein decoding the encoded information further comprises identifying presence or absence of a spoke of the spoke pattern of light.

28. The optical identification tag of claim 26, wherein decoding the encoded information further comprises identifying a distance between adjacent spokes of the spoke pattern of light.

* * * * *